United States Patent
Kim et al.

(10) Patent No.: US 9,002,400 B2
(45) Date of Patent: Apr. 7, 2015

(54) APPARATUS AND METHOD FOR CONTENT DISPLAY IN A MOBILE TERMINAL

(71) Applicant: Samsung Electronics Co., Ltd., Gyeonggi-do (KR)

(72) Inventors: Kyunghwa Kim, Seoul (KR); Jiyoung Kang, Gyeonggi-do (KR); Seonhwa Kim, Seoul (KR); Heewoon Kim, Gyeonggi-do (KR); Dongjun Shin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 120 days.

(21) Appl. No.: 13/671,797

(22) Filed: Nov. 8, 2012

(65) Prior Publication Data

US 2013/0150124 A1    Jun. 13, 2013

(30) Foreign Application Priority Data

Dec. 8, 2011 (KR) .......................... 10-2011-0130770

(51) Int. Cl.
*H04W 88/02* (2009.01)
*H04W 64/00* (2009.01)
*G06F 17/30* (2006.01)

(52) U.S. Cl.
CPC ......... *H04W 64/00* (2013.01); *G06F 17/30274* (2013.01); *G06F 17/3087* (2013.01)

(58) Field of Classification Search
USPC .............................................. 455/556.4, 457
See application file for complete search history.

(56) References Cited

U.S. PATENT DOCUMENTS

| 8,326,851 | B2 * | 12/2012 | Grune et al. .................. 707/758 |
| 2006/0075356 | A1 * | 4/2006 | Faulkner et al. .............. 715/782 |
| 2011/0161875 | A1 * | 6/2011 | Kankainen .................... 715/810 |
| 2011/0279446 | A1 | 11/2011 | Castro et al. |
| 2012/0250940 | A1 * | 10/2012 | Kasahara ...................... 382/103 |
| 2012/0290950 | A1 * | 11/2012 | Rapaport et al. ............. 715/753 |
| 2012/0328196 | A1 * | 12/2012 | Kasahara et al. ............ 382/190 |
| 2013/0012237 | A1 * | 1/2013 | Hamynen et al. .......... 455/456.3 |
| 2013/0027555 | A1 * | 1/2013 | Meadow ....................... 348/144 |

(Continued)

OTHER PUBLICATIONS

Sukan, Mengu, et al.; "SnapAR: Storing Snapshots for Quick Viewpoint Switching in Hand-Held Augmented Reality;" 2010 9th IEEE Int'l Symposium on Mixed & Augmented Reality (ISMAR); Oct. 13, 2010; pp. 273-274; XP032291077.

(Continued)

*Primary Examiner* — Diane Mizrahi
(74) *Attorney, Agent, or Firm* — Cha & Reiter, LLC

(57) ABSTRACT

An apparatus and method for content display in a mobile terminal include: a sensing unit including a location determiner generating current location information of the mobile terminal including latitude, longitude and altitude; a content storage storing content items; a control unit controlling a process of storing, when a content item is created, the created content item together with location information in the content storage, setting a display region for content display, examining location information of stored content items, and displaying content items created at a place belonging to the display region in three dimensions; and a display unit displaying content items at corresponding places of the display region under control of the control unit.

22 Claims, 14 Drawing Sheets

(56) References Cited

U.S. PATENT DOCUMENTS

| | | | |
|---|---|---|---|
| 2013/0093787 A1* | 4/2013 | Fulks et al. | 345/629 |
| 2013/0132375 A1* | 5/2013 | Jones et al. | 707/722 |
| 2013/0135344 A1* | 5/2013 | Stirbu et al. | 345/629 |
| 2013/0222375 A1* | 8/2013 | Neophytou et al. | 345/419 |
| 2013/0250111 A1* | 9/2013 | Watanabe et al. | 348/148 |
| 2014/0010542 A1* | 1/2014 | Nielsen et al. | 398/66 |
| 2014/0139523 A1* | 5/2014 | Neophytou et al. | 345/420 |
| 2014/0162697 A1* | 6/2014 | Cudalbu et al. | 455/456.3 |

OTHER PUBLICATIONS

Selonen, Petri, et al.; "Mixed Reality Web Service Platform;" Multimedia Systems, vol. 18, No. 3; Nov. 27, 2011; pp. 215-230; XP035061160.

Morrison, Ann, et al.; "Collaborative Use of Mobile Augmented Reality With Paper Maps;" Computers and Graphics, vol. 35, No. 4; Apr. 28, 2011; pp. 789-799; XP028245047.

* cited by examiner

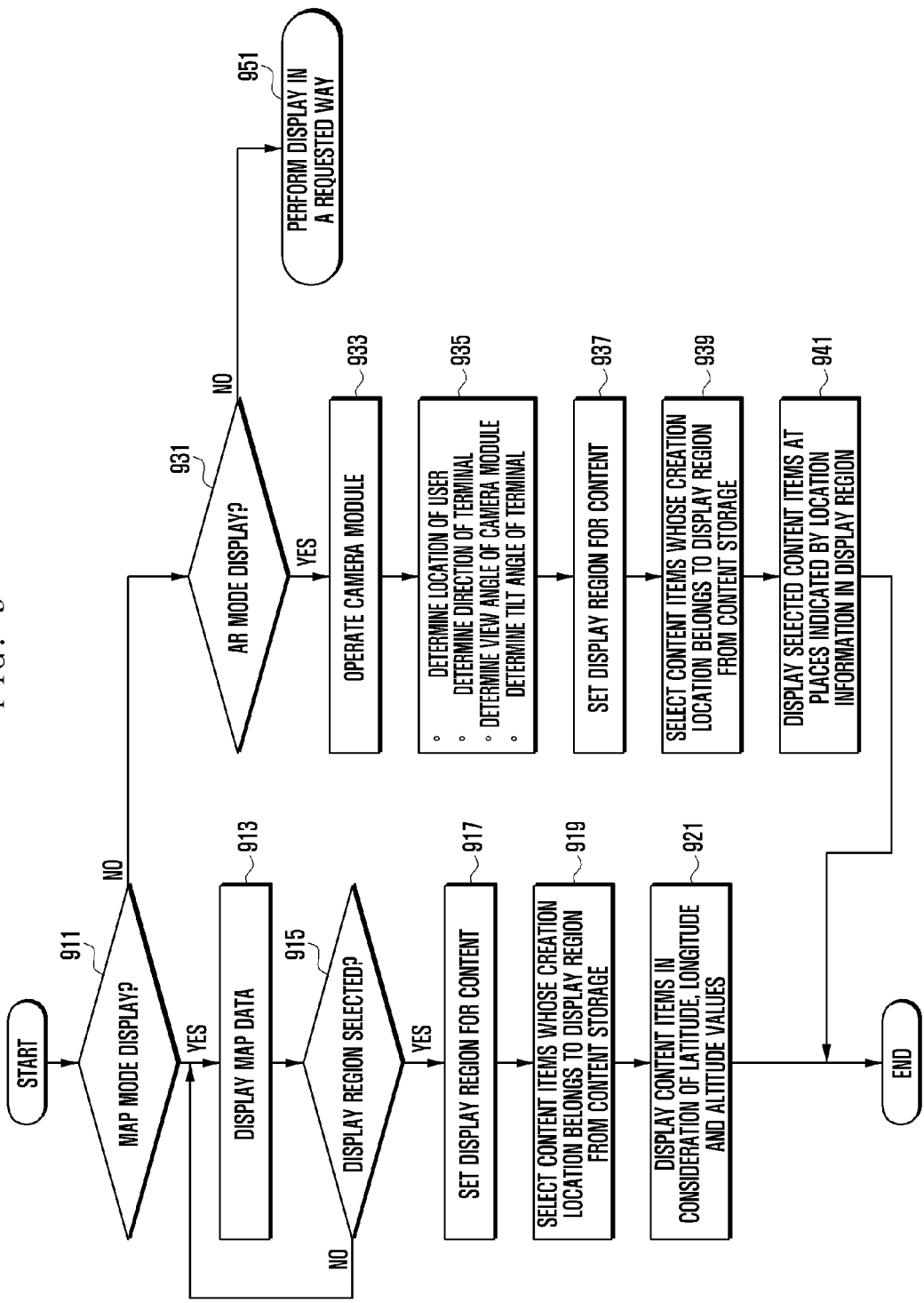

APPARATUS AND METHOD FOR CONTENT DISPLAY IN A MOBILE TERMINAL

CLAIM OF PRIORITY

This application claims, pursuant to 35 U.S.C. §119(a), priority to and the benefit of the earlier filing date of a Korean patent application filed on Dec. 8, 2011 in the Korean Intellectual Property Office and assigned Serial No. 10-2011-0130770, the entire disclosure of which is hereby incorporated by reference.

BACKGROUND OF THE INVENTION

1. Field of the Invention

The present invention relates to display of content in a mobile terminal and, more particularly, to an apparatus and method for content display in a mobile terminal wherein content can be displayed in various perspectives with respect to a content creation environment.

2. Description of the Related Art

In the prior art, advanced mobile terminals, which have a camera module for high-resolution imaging, and units for high-speed communication and high-definition display, can support various types of communication and multimedia services. Such a mobile terminal may process various types of content by importing content from the outside, generating content internally, and adding supplementary information to existing content.

However, to identify information added to content items in a mobile terminal, the user of the mobile terminal may have to check each content item. For example, when taking photographs, the user may attach information on the shooting location to photographs taken at a specific location and store the photographs. Later, to identify the shooting location of stored photographs, the user may have to select each photograph and examine the shooting location thereof. That is, the user may be unable to collectively identify content items created at a given region or location.

SUMMARY OF THE INVENTION

The present invention has been made in view of the above problems and the present invention provides an apparatus and method for a mobile terminal wherein content is stored together with location information at the time of creation and is displayed later in various ways based on the creation location.

The present invention also provides an apparatus and method for a mobile terminal wherein content is stored together with location information collected by a combination of sensors at the time of creation and is presented together with location information in various ways on a map or a captured image.

In an exemplary embodiment of the present invention, the mobile terminal stores content items together with location information composed of latitude, longitude and altitude at the time of creation. When a display region is set for content display on a map, the mobile terminal selects a content item whose creation location belongs to the display region and marks the selected content item in the display region on the map based on altitude. In another exemplary embodiment, a display region is set for content display on the basis of the current location, direction and tilt of the mobile terminal, and the view angle of a camera module, and a content item whose creation location belongs to the display region is selected and marked at a corresponding location on an image captured by the camera module.

In accordance with an exemplary embodiment of the present invention, there is provided an apparatus for content display in a mobile terminal, including: a sensing unit including a location determiner generating current location information of the mobile terminal including latitude, longitude and altitude; a content storage storing content items; a control unit controlling a process of storing, when a content item is created, the created content item together with location information in the content storage, setting a display region for content display, examining location information of stored content items, and displaying content items created at a place belonging to the display region in three dimensions; and a display unit displaying content items at corresponding places of the display region under control of the control unit.

In accordance with another exemplary embodiment of the present invention, there is provided an apparatus for content display using a 3D map in a mobile terminal, including: a location determiner generating current location information of the mobile terminal including latitude, longitude and altitude; a content storage storing content items having 3D location information; a map storage storing 3D map data; a control unit controlling a process of storing, when a content item is created, the created content item together with location information generated by the location determiner in the content storage, displaying selected map data from the map storage for content display, setting a display region on the displayed map, examining location information of stored content items, and displaying content items created at a place belonging to the display region in three dimensions; and a display unit displaying content items at corresponding places of the display region under control of the control unit.

In accordance with another exemplary embodiment of the present invention, there is provided an apparatus for content display using camera imaging in a mobile terminal, including: a camera module; a sensing unit including a location determiner generating 3D location information of a location where the mobile terminal is placed or a content item is created in latitude, longitude and altitude, a direction determiner identifying the current direction of the camera module, a view angle determiner identifying the view angle of the camera module, and a tilt angle determiner identifying the tilt angle of the mobile terminal; a content storage storing content items having 3D location information; a control unit controlling a process of storing, when a content item is created, the created content item together with 3D location information, which indicates a place where the content item was created and is generated by the location determiner, in the content storage, setting a display region for content display on an image captured by the camera module on the basis of 3D location information of the mobile terminal, tilt angle information, direction information and view angle information, examining 3D location information of stored content items, and displaying content items created at a place within the display region in three dimensions; and a display unit displaying content items at corresponding places of the display region in three dimensions under control of the control unit.

In accordance with another exemplary embodiment of the present invention, there is provided a method for content display in a mobile terminal, including: storing, when a content item is created, the created content item together with 3D location information including latitude, longitude and altitude, which indicates a place where the content item is created and is generated by a location determiner, in a content storage; and performing content display by setting a display region, examining location information of stored content items, selecting content items created at a place within the display region, and displaying the selected content items at corresponding places of the display region in three dimensions.

In accordance with another exemplary embodiment of the present invention, there is provided a method for content display using a 3D map in a mobile terminal, including: storing, when a content item is created, the created content item together with 3D location information including latitude, longitude and altitude, which indicates a place where the content item is created and is generated by a location determiner, in a content storage; and performing content display in a map mode by displaying selected map data from a map storage storing 3D map data, setting a display region on the map, examining location information of stored content items, selecting content items created at a place within the display region, and displaying the selected content items in three dimensions.

In accordance with another exemplary embodiment of the present invention, there is provided a method for content display using camera imaging in a mobile terminal, including: storing, when a content item is created, the created content item together with 3D location information including latitude, longitude and altitude, which indicates a place where the content item is created and is generated by a location determiner, in a content storage; and performing content display in an augmented reality (AR) mode by operating a camera module, setting a display region on an image captured by the camera module on the basis of 3D location information and tilt angle information of the mobile terminal, and direction information and view angle information of the camera module, examining location information of stored content items, selecting content items whose creation location is within a preset visibility range in the display region, and displaying the selected content items in three dimensions.

BRIEF DESCRIPTION OF THE DRAWINGS

The features and advantages of the present invention will be more apparent from the following detailed description in conjunction with the accompanying drawings, in which:

FIG. 9 is a flowchart of a procedure for displaying content with location information in the present invention.

DETAILED DESCRIPTION OF THE INVENTION

Figure 1:
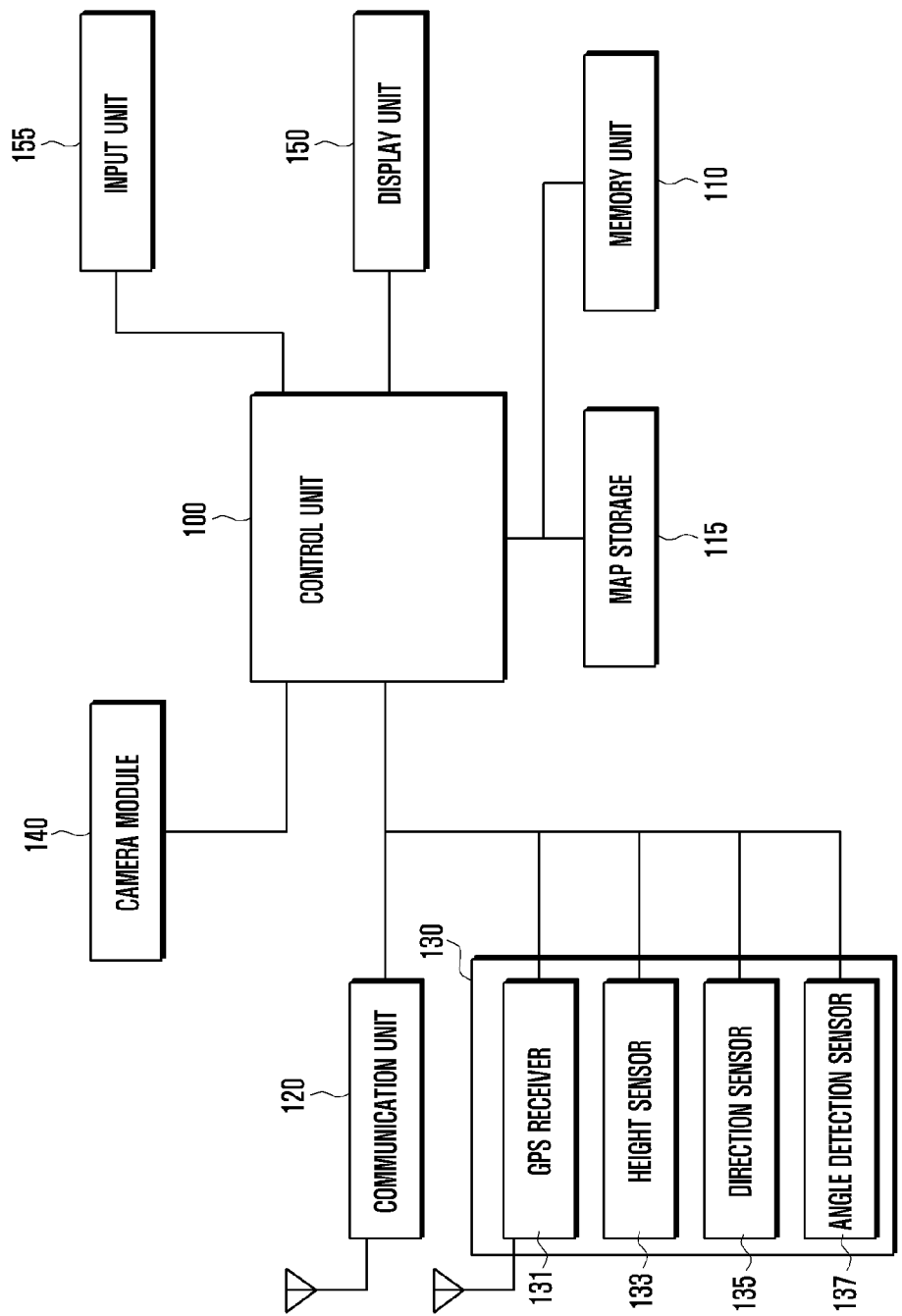
FIG. 1 is a block diagram of a mobile terminal according to an exemplary embodiment of the present invention.

Hereinafter, exemplary embodiments of the present invention are described in detail with reference to the accompanying drawings. The same reference symbols are used throughout the drawings to refer to the same or like parts. In the following description, a detailed explanation of known related functions and constructions may be omitted to avoid unnecessarily obscuring the subject matter of the present invention. The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

In the present invention, when content is created in a mobile terminal, location information such as latitude, longitude and altitude at the creation time is generated and the content is stored together with the location information. Here, the content may be items captured by a camera such as images and moving images, information items created by the user such as memos and notes, recorded items such as voice recordings, and downloaded information items.

When created content is displayed, a map or augmented reality (AR) may be used to present the content. In the map mode, when a display region is set on a displayed map, the mobile terminal examines location information of stored content items, selects content items whose creation location belongs to the display region, and marks the selected content items in the display region on the map based on altitude. Here, the map may be a 3D map with a street view, satellite view or other known types of views. In the AR mode, a display region is set for content display on the basis of the current location, direction and tilt of the mobile terminal, and the view angle of a camera module, and the mobile terminal examines location information of stored content items, selects content items whose creation location belongs to the display region and marks the selected items at corresponding locations on an image captured by the camera module. Here, the location, direction and tilt of the mobile terminal may be obtained using sensors installed in the mobile terminal.

The mobile terminal of the present invention is equipped with applications for creating content such as images, photographs, notes, memos and voice recordings, a sensing unit for generating location information, such as latitude, longitude and altitude at the time of creation, of content items, and a sensing unit for generating display region information such as location, direction and tilt, and/or map data.

In the following description, the term "3D location information" indicates location information specified by latitude, longitude and altitude, and the term "3D display" indicates a display or marking of content items at creation locations in a display region based on latitude, longitude and altitude. A "display region" may be set on a 3D map displayed on the display unit in a map mode or set on a camera-captured image displayed on the display unit in an AR mode. In a "AR mode display", content items with 3D location information are displayed or marked in three dimensions on an image captured by a camera module.

FIG. 1 is a block diagram of a mobile terminal according to an exemplary embodiment of the present invention.

Referring to FIG. 1, a sensing unit 130 of the mobile terminal generates location information of content items for content creation and information to set a display region for content presentation. A Global Positioning System (GPS) based receiver 131 generates location information of the mobile terminal. Here, the location information may include latitude and longitude data. A height sensor 133 generates height or altitude data of the mobile terminal. The height sensor 133 may use a sensor sensing atmospheric pressure, a sensor using satellite signals and/or pressure sensing, or a radar-based sensor. Here, when the GPS receiver 131 is capable of sensing altitude, the height sensor 133 may be excluded. A direction sensor 135 senses an orientation of the mobile terminal in three dimensions. The direction sensor 135 may be implemented using a geomagnetic sensor and/or a gyroscopic sensor. An angle detection sensor 137 senses the tilt angle and motion, such as rotation, of the mobile terminal. Here, the angle detection sensor 137 may sense the tilt angle between a horizontal plane, parallel to a substantially planar portion of the earth's surface, and the mobile terminal and motion of the mobile terminal when the mobile terminal is gripped or worn by a user, or otherwise mounted to a portion of the body of the user. The angle detection sensor 137 may be implemented using an accelerometer and/or a gyroscopic sensor.

A communication unit 120 establishes a wireless connection with a corresponding communication network. Here, the communication network may be a mobile communication network or an Internet Protocol (IP) based network such as the Internet and/or the World Wide Web. The communication unit 120 may include a transmitter for upconverting the frequency of a signal to be transmitted and amplifying the signal, and a receiver for low-noise amplifying a received signal and downconverting the frequency of the received signal. The communication unit 120 may further include a modulator for modulating a signal to be transmitted and forwarding the modulated signal to the transmitter, and a demodulator for demodulating a signal received through the receiver. Here, modulation and demodulation may be conducted according to any known methods, such as LTE (4G), WCDMA (3G), GSM, Wi-Fi, WiBro or WiMAX.

A camera module 140 captures images of objects external to the mobile terminal.

A display unit 150 displays information under the control of a control unit 100. An input unit 155 receives commands and data, such as alphanumeric data, for controlling operation of the mobile terminal. The input unit 155 and the display unit 150 may be combined as a touchscreen, or alternatively, a touchscreen may be incorporated into at least one of the display unit 150 and the input unit 155.

A map storage 115 stores map data to represent created content. The map data stored in the map storage 115 may be used to display a 3D map with a street view, satellite view or other known types of views.

The control unit 100 controls the overall operation of the mobile terminal. In particular, the control unit 100 controls a process of creating, storing and displaying content items.

A memory unit 110 may include a program area to store programs for operating the mobile terminal and for implementing functions of the present invention, and a data area to store installation data and data generated during program execution. The memory unit 110 further includes a content storage to store created content together with location information. In addition, the memory unit 110 may also include the map storage 115.

In the mobile terminal having the configuration described herein, when content is created, the control unit 100 controls the GPS receiver 131 and height sensor 133 to generate location information corresponding to latitude, longitude and/or altitude of the mobile terminal at the creation time and controls an operation to store the created content together with the location information in the content storage of the memory unit 110. Here, the content may be items captured by the camera module 140 such as still and moving images, multimedia information items downloaded through the communication unit 120, information items created through the input unit 155 such as memos and notes, and items created through a microphone such as voice recordings. Thumbnail images and icons may be stored together with corresponding content items in the content storage.

When stored content is displayed, for example, by the display unit 150, the control unit 100 may use a map or augmented reality (AR) feature. In this case, content items may be represented as thumbnails or icons at corresponding locations on a map or on an augmented reality image.

In the map mode, the control unit 100 reads selected map data from the map storage 115 and displays the map data on the display unit 150. When a display region is set by the user on the displayed map, the control unit 100 examines location information of content items stored in the content storage of the memory unit 110, selects content items whose creation location belongs to the set display region, and marks the selected content items in the set display region on the map based on altitude.

In the AR mode, the control unit 100 identifies the current location of the mobile terminal using the GPS receiver 131 and/or using the height sensor 133, identifies the direction of orientation or movement of the mobile terminal; for example, North, East, West and South, i.e., the direction indicated by the lens of the camera module 140 using the direction sensor 135, determines the view angle of an image captured by the camera module 140 on the basis of a predetermined or set zoom ratio, identifies the tilt angle of the mobile terminal using the angle detection sensor 137, and sets a display region for content display on the basis of the current location, direction and tilt angle of the mobile terminal, and the view angle of the camera module 140. Thereafter, the control unit 100 examines location information of content items stored in the content storage of the memory unit 110, selects content items whose creation location belongs to the display region, and marks the selected content items in the display region on the display unit 150. Here, as an image captured by the camera module 140 is being displayed on the display unit 150, the selected content items are marked at corresponding locations on the captured image.

Displayed content items may be represented as thumbnails or icons on a map or on an AR image. When multiple content items are present at the same location, the control unit 100 may display corresponding thumbnails or icons in an overlapped manner, or display a numerical value or message corresponding to and/or indicating the number of content items. When one of the displayed thumbnails or icons is selected, the control unit 100 may display details of a content item corresponding to the selected thumbnail or icon on the display unit 150.

Next, a description is given of a method for creating and displaying content according to the exemplary embodiment of the present invention. In the following description, the content includes photographed or other visual images such as moving images and video, for illustrative purposes only, but may be any other type of content.

Figure 2:
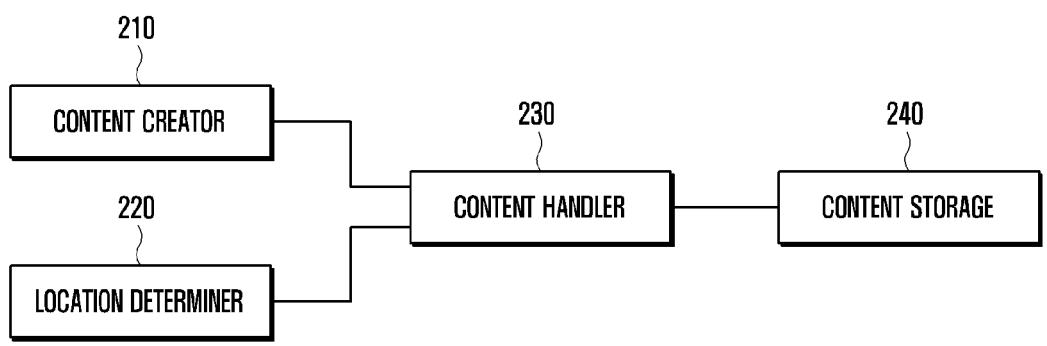
FIG. 2 illustrates a configuration for content creation in the mobile terminal of the present invention.

FIG. 2 illustrates a configuration for content creation in the mobile terminal of the present invention.

Referring to FIG. 2, the user of the mobile terminal may create various types of content. Here, the content may be image items captured by the camera module 140 such as photographs and moving images, information items created through the input unit 155 such as memos and schedules, audio items created through an audio processing unit, which may, for example, be implemented by any known audio processing devices, or may be included in the input unit 155 and/or the controller 100, and may include a microphone, or otherwise may be obtained from an external source through the communication unit 120, such as voice recordings, multimedia data downloaded through the communication unit 120 such as movies, documents, music files and other types of media data, and information items created by the user such as documents containing video, audio and image data.

In one exemplary embodiment, a content creator 210 creates content items that are to be displayed in three dimensions. To achieve this, the content creator 210 may include the camera module 140, the communication unit 120 and/or the input unit 155. The content creator 210 may encode content items obtained through these units 120, 140, 155 in a storable form, and combine multiple content items. Content items that are displayable in three dimensions may be specified by the user in a setting mode or pre-specified during the manufacturing process.

In the case of a photographed image, a photograph captured by the camera module 140 is displayed on the display unit 150. When the user issues a storage request, the content creator 210 applies image processing operations such as scaling, compression, transformation, etc. to the captured photograph. Here, the content creator 210 may include the camera module 140. The location determiner 220 creates location information for the photograph using information on the location where the photograph is taken. The GPS receiver 131 may identify latitude, longitude and altitude or may identify latitude and longitude only. Here, the GPS receiver 131 identifies, for example, latitude and longitude only on a plane. When the GPS receiver 131 identifies plane coordinates such as latitude and longitude of a location where the mobile terminal is placed and the height sensor 133 identifies the altitude of the location where the mobile terminal is placed, the location determiner 220 may determine the location including latitude, longitude and altitude where the content item is created, such as where the photograph is taken, on the basis of the results from the GPS receiver 131 and height sensor 133. Here, the location determiner 220 may include the GPS receiver 131 and/or the height sensor 133.

A content handler 230 stores a created content item and associated location information in a content storage 240. Here, the content storage 240 is a portion of the memory unit 110, and may store, for each content item, content name, creation time, location data such as latitude, longitude and altitude, and content data. The content handler 230 may add a short memo, written through the input unit 155, to the created content item. Hence, content information stored in the content storage 240 may have an example format illustrated in Table 1.

TABLE 1

Content name
Creation time
(year, month, day, hour, etc.)
Location information
latitude (X)
longitude (Y)
altitude (H)
Memo
Content
(photograph, moving image,
document, voice recording, etc.)

Figure 3:
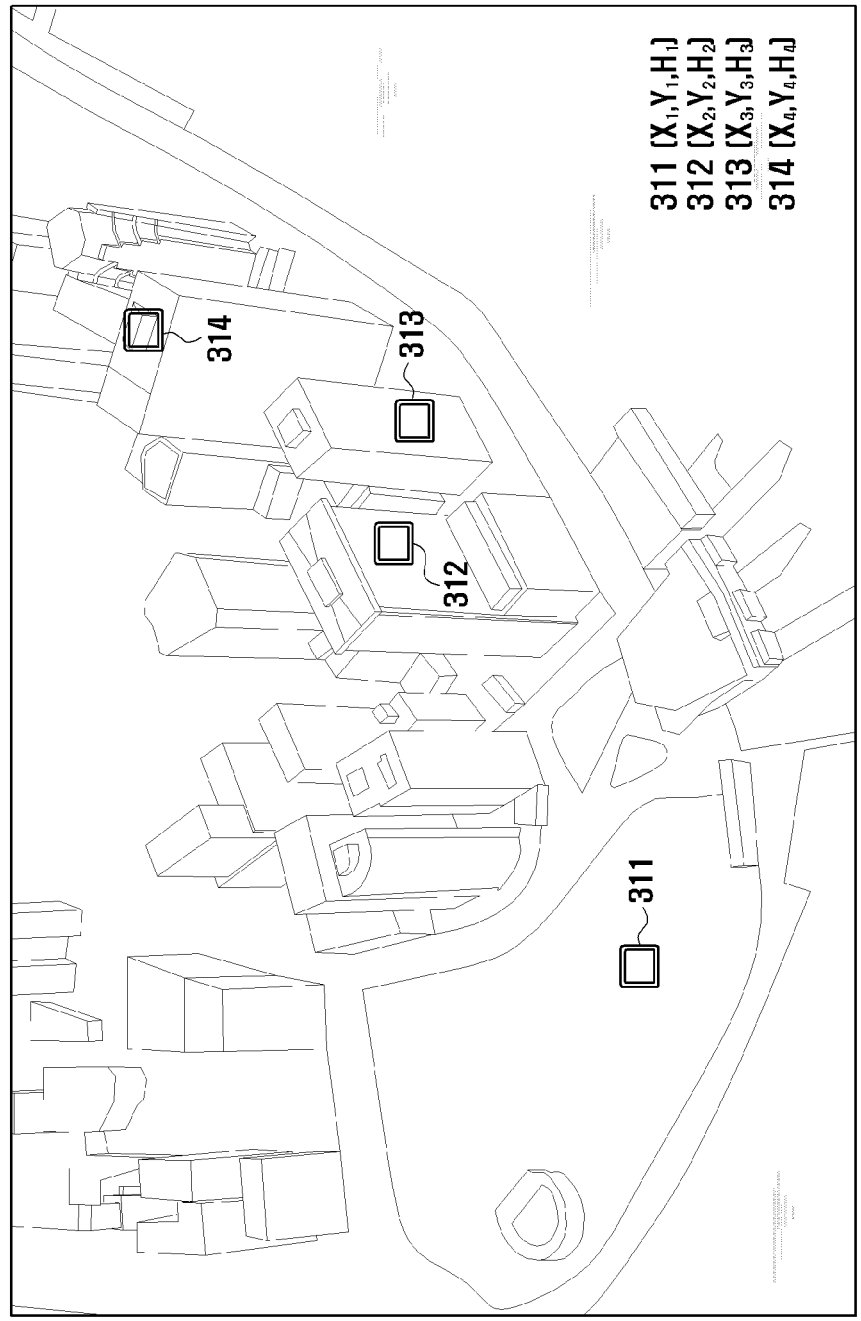
FIG. 3 illustrates acquisition of location information for content created in the mobile terminal of the present invention.

FIG. 3 illustrates acquisition of location information for content created in the mobile terminal of the present invention.

Referring to FIG. 3, location information of a created content item may include altitude (H) in addition to latitude as an X-axis coordinate and longitude as a Y-axis coordinate. For example, the user may take photographs using the camera module 140 at various places of different heights; for example, on a street, on top of a building, or in an underground shopping mall. In one exemplary embodiment, when a content item is displayed in a display mode, the location and height of the place where the content item is created are displayed together. For example, referring to FIG. 3, when the user takes a photograph at one of the imaged locations 311 to 314, the location determiner 220 generates location information composed of latitude, longitude and altitude of the place where the photograph is taken; and the content handler 230 stores the photograph, as a content item created by the content creator 210, together with the location information in the content storage 240. Later, the content stored in the content storage 240 may be displayed in three dimensions.

Content items stored in the content storage 240 may be displayed in three dimensions according to the location information thereof. That is, content items may be displayed on a 3D map or on a 3D screen image selected by the user. Content items may be displayed in a map mode or an AR mode. Here, display of content items may be conducted on a 3D map in the map mode, and on an image captured by the camera module 140 in the AR mode.

Next, a description is given of a map mode display.

Figure 4:
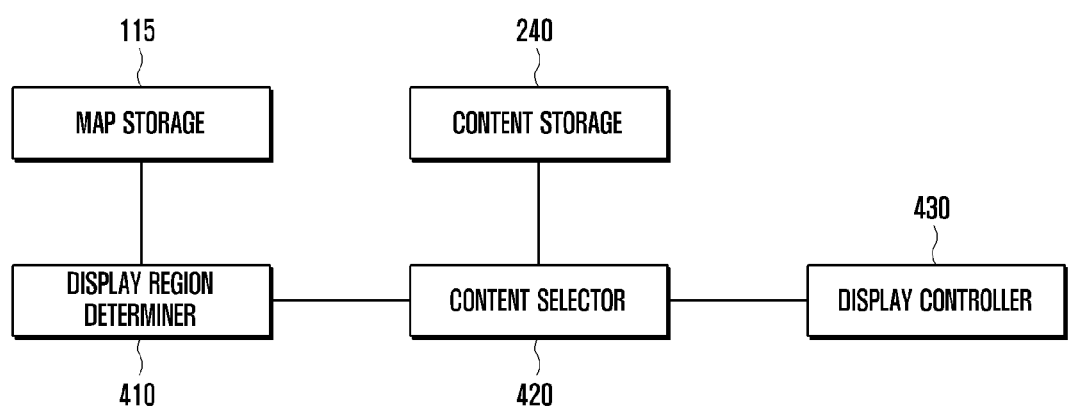
FIG. 4 illustrates a configuration for displaying content with location information on a map in the mobile terminal of the present invention.
Figure 5A:
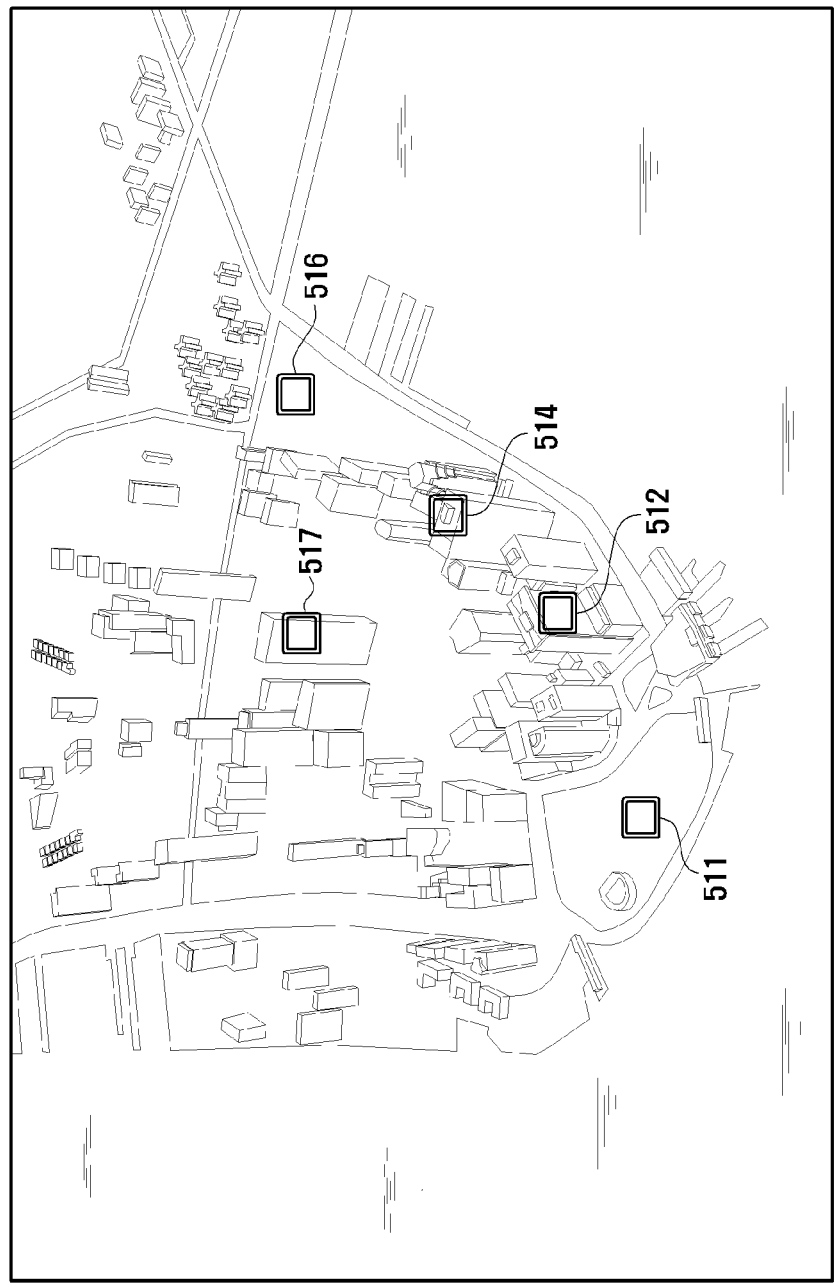
FIG. 5A illustrates a display of content in the present invention with location information on a three dimensional (3D) map.

FIG. 4 illustrates a configuration for displaying content with location information on a map in the mobile terminal of the present invention. FIG. 5A illustrates display of content in the present invention with location information on a 3D map, and FIG. 5B illustrates display of content items in the present invention with the same location information.

Figure 5B:
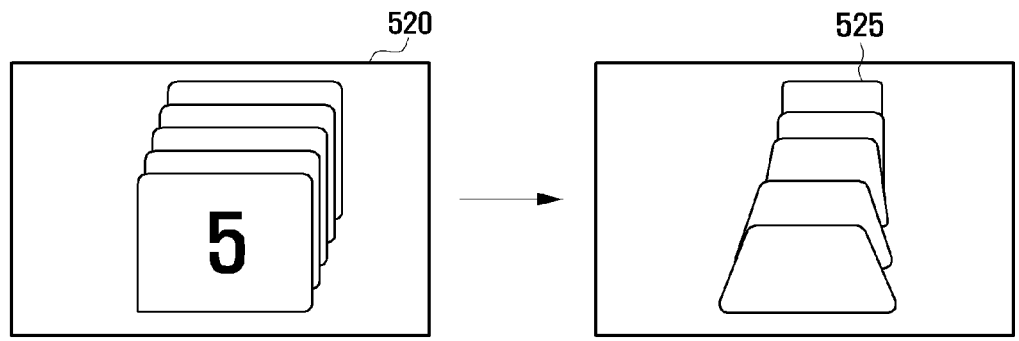
FIG. 5B illustrates a display of content items in the present invention with the same location information.

Referring to FIGS. 4 to 5B, to display content items with location information on a map, the user issues a map display request through the input unit 155. In response to the request, the control unit 100 reads requested map data from the map storage 115 and displays the map data on the display unit 150. Here, the map may be a 3D map with a street view, satellite view or other known types of views. Map data may be downloaded through the communication unit 120 and stored in the map storage 115. The map storage 115 may be a removable storage device. In this case, external map data may be stored in the map storage 115, which is then connected to the mobile terminal to allow transfer of the external map data to the mobile terminal. Thereafter, when the user selects a region on the displayed map as a display region for content display, the control unit 100 selects content items whose creation location belongs to the display region and displays the selected content items in three dimensions on the map.

In response to a map display request, a display region determiner 410 reads requested map data from the map storage 115, displays the map data as shown in FIG. 5A, and sets a display region on the map on the display unit 150 according to the user selection. The display region is a region of a 3D map with latitude, longitude and altitude values. FIG. 5A illustrates an example of a 3D map with a display region. After setting the display region, the content selector 420 selects content items to be displayed in the display region from the content storage 240. As described above in connection with Table 1, content items stored in the content storage 240 have location information composed of latitude, longitude, and altitude values. The content selector 420 selects content items having latitude and longitude values belonging to the display region. Thereafter, the display controller 430 displays the selected content items as thumbnails in three dimensions on the map using altitude values as shown in FIG. 5A. Here, thumbnails may be images or icons representing content types such as photographs, moving images, messages and documents.

In FIG. 5A, content items 511 to 516 may have a format illustrated in Table 1, and are placed at respective creation locations. As each content item has latitude, longitude and altitude values, the display controller 430 may determine plane coordinates on the map using the latitude and longitude values and may determine the height on the map using the altitude value. Hence, the display controller 430 may display content items in three dimensions on the map displayed on the display unit 150 as shown in FIG. 5A.

Multiple content items may be created at the same location. In this case, the display controller 430 may indicate that multiple content items are present at a single location. For example, the display controller 430 may indicate presence of multiple content items as shown in FIG. 5B. The display controller 430 may indicate presence of multiple content items by overlapping thumbnails, by a number indicating the number of content items, or by a combination thereof as indicated by reference numeral 520. When one thumbnail is touched or dragged by a user selection through the display unit 150 and/or the input unit 155 including a touch screen when the thumbnails are in a display arrangement 520 shown in FIG. 5B, the display controller 430 may change the display arrangement 520 of the content items to a new display arrangement 525.

In a state in which content items are displayed on the touch screen as thumbnails on a map as shown in FIG. 5A, when the user touches a selected thumbnail, the display controller 430 may display information; for example, a memo, on a content item associated with the touched thumbnail; and when the user selects a thumbnail by entering, for example, a double touch, to the touch screen, the display controller 430 may display details of a content item associated with the selected thumbnail on the display unit 150.

Next, a description is given of an AR mode display.

Figure 6:
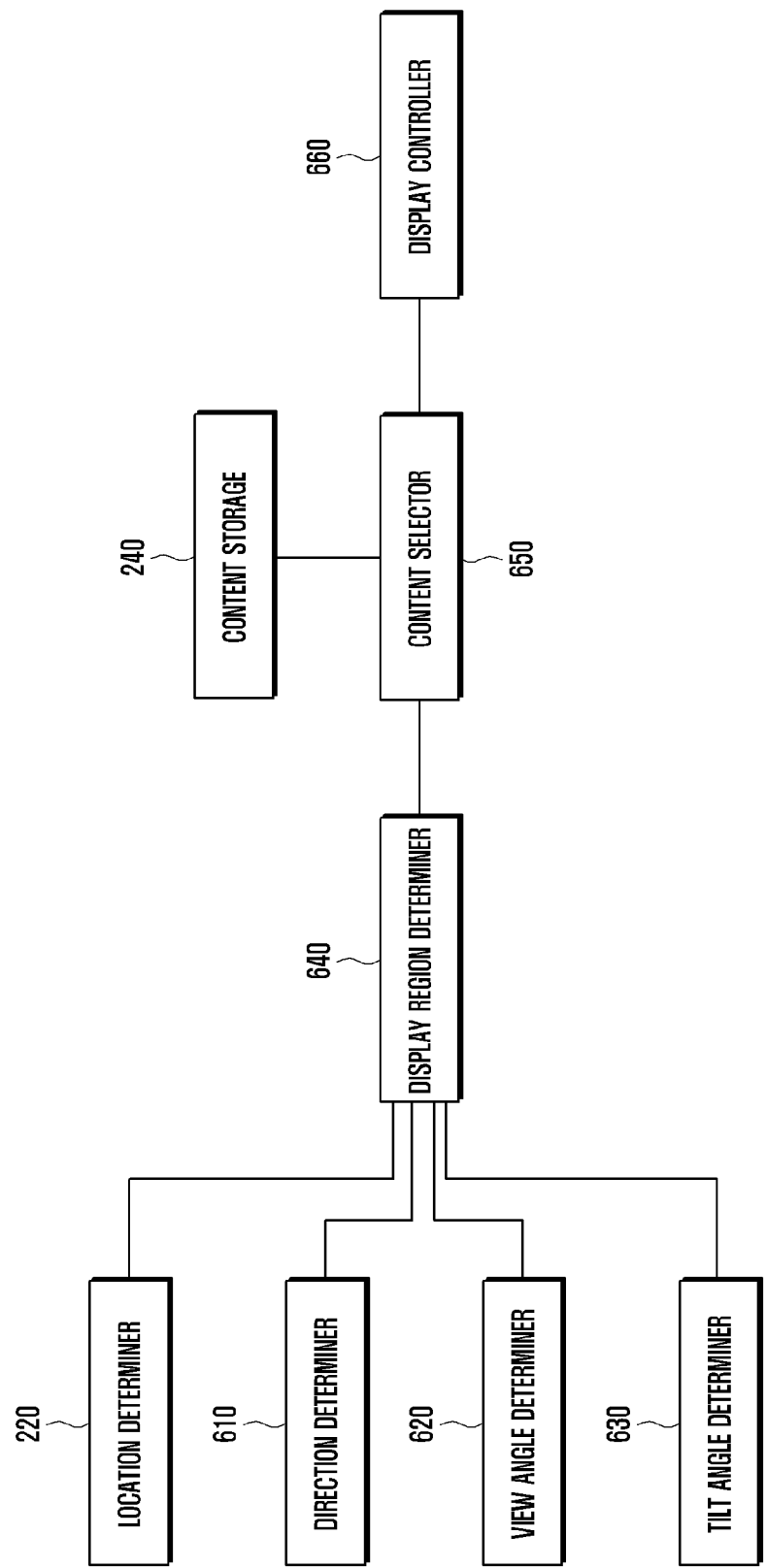
FIG. 6 illustrates a configuration for displaying content with location information in an AR mode in the mobile terminal of the present invention.
Figure 7A:
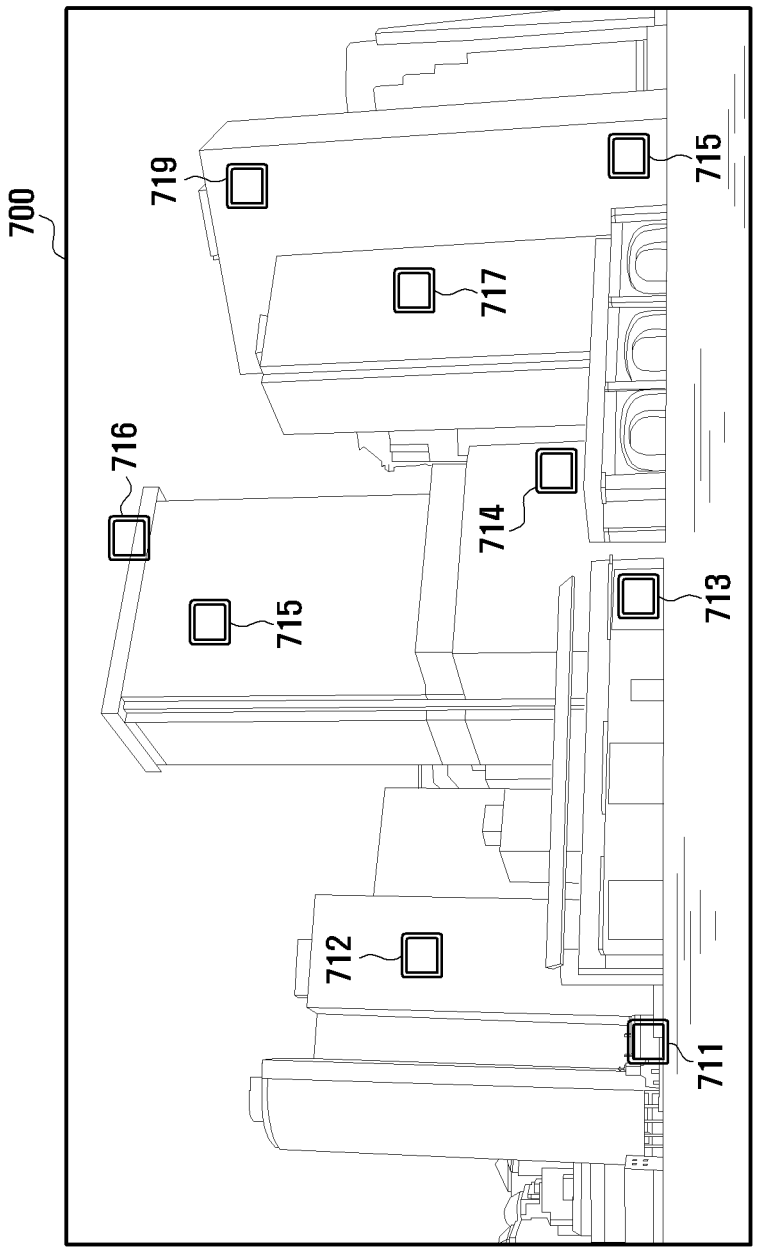
FIGS. 7A to 7C illustrate display of content with location information in the AR mode in the present invention.
Figure 7B:
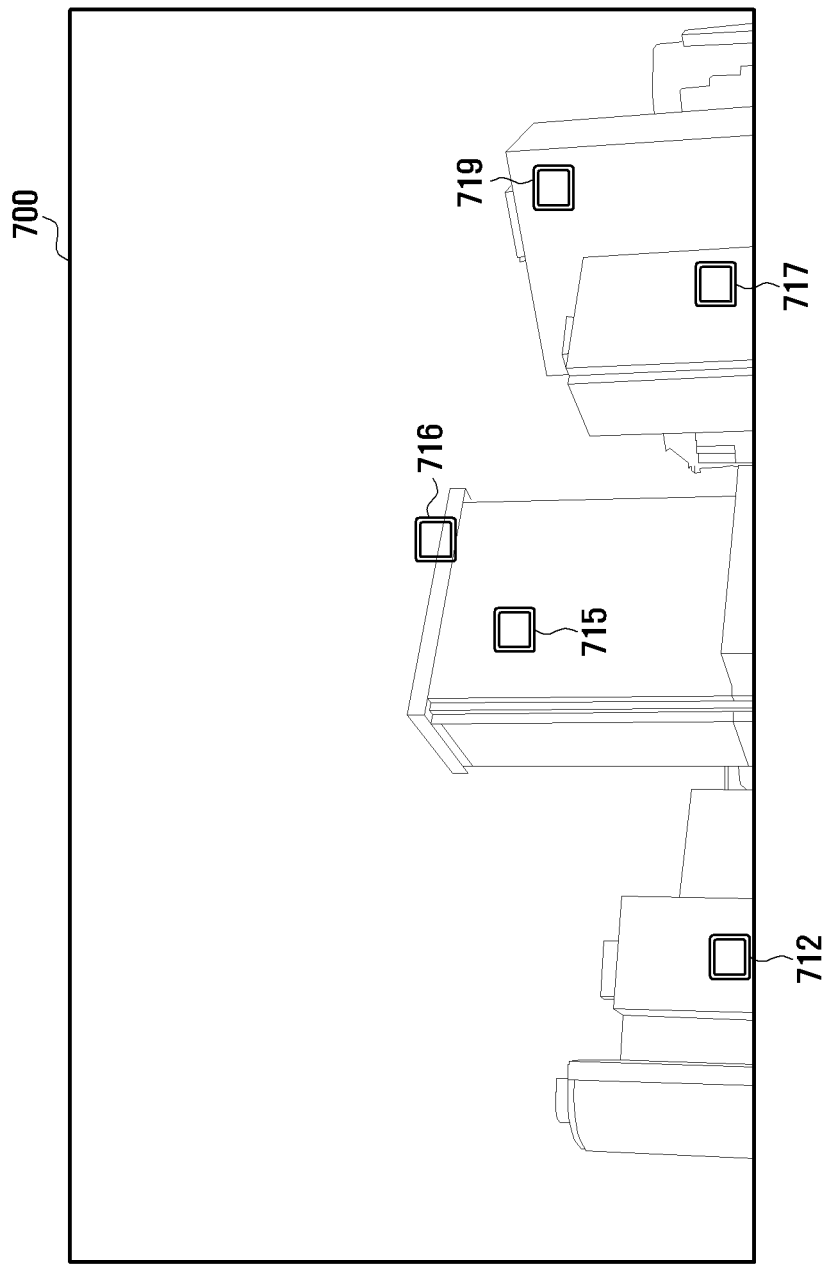
Figure 7C:
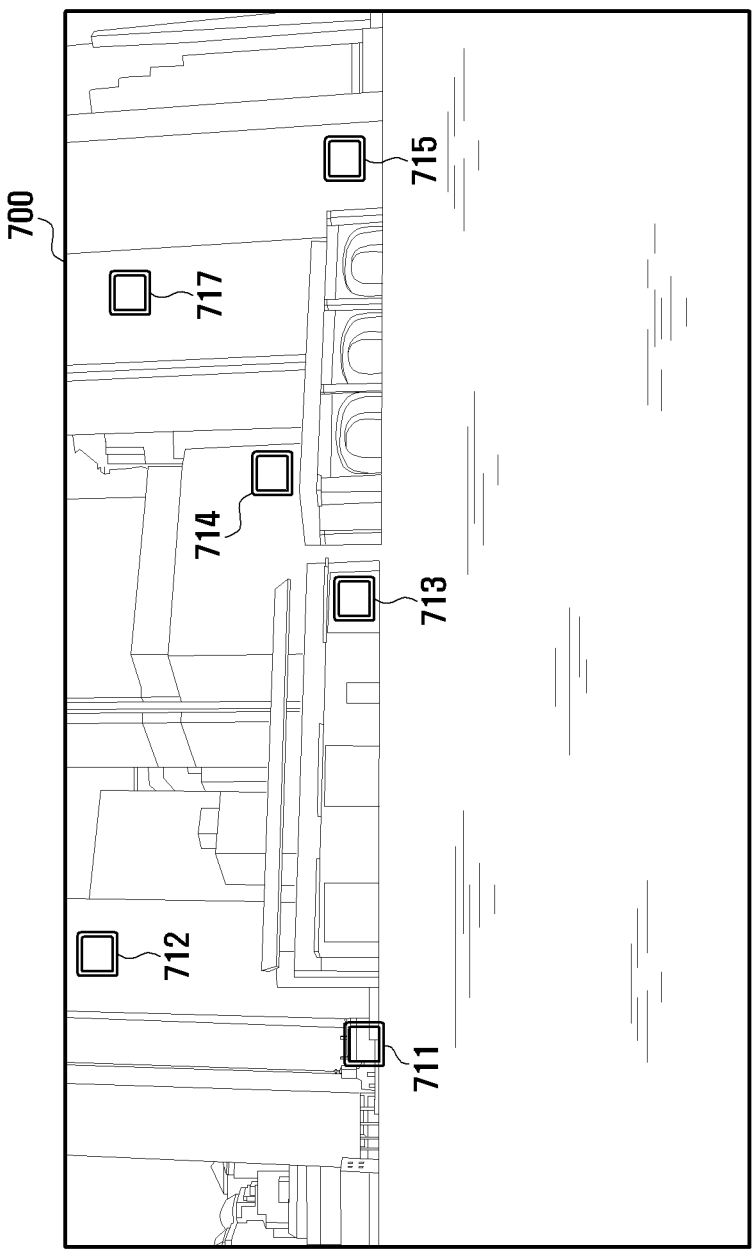

FIG. 6 illustrates a configuration for displaying content with location information in an AR mode in the mobile terminal of the present invention. FIGS. 7A to 7C illustrate the display of content with location information in the AR mode in the present invention.

Referring to FIGS. 6 to 7C, to display content items with location information in the AR mode, the user operates the camera module 140. The control unit 100 controls the display unit 150 to display an image captured by the camera module 140. The control unit 100 displays content items created in a region defined by the image in three dimensions on the image. To achieve this, the control unit 100 needs information regarding the current location of the user, specified by latitude, longitude and altitude, a direction of the mobile terminal such as an orientation or movement of the mobile terminal and/or a shooting direction of the camera module 140, a tilt angle of the mobile terminal, a view angle of an image captured by the camera module 140, and a visibility range of the display region set by the user or manufacturer.

When the user selects the AR mode and operates the camera module 140, the control unit 100 displays an image captured by the camera module 140 on the display unit 150, identifies the current location of the mobile terminal, and sets a region for content display. The location determiner 220 determines the current location including latitude, longitude and altitude of the mobile terminal. As described herein, the location determiner 220 may include the GPS receiver 131 and the height sensor 133, and identifies latitude, longitude and altitude of a location where the mobile terminal is placed on the basis of outputs from the GPS receiver 131 and the height sensor 133.

A direction determiner 610 identifies the current direction of the camera module 140. Here, the direction determiner 610 may include the direction sensor 135, which may be a geomagnetic sensor and/or a gyroscopic sensor. The direction determiner 610 may produce a direction value in angles between the front direction of the camera module 140 and the North magnetic pole, or any other known or predetermined reference direction.

A tilt angle determiner 630 identifies the tilt angle of the mobile terminal; for example, an angle with respect to the ground. For example, the user may take a high-angle shot, for example, with the camera is looking down at the subject or a low-angle shot, for example, with the camera is looking up at the subject. A high-angle shot and a low-angle shot taken at the same place may produce different images. Hence, to set a display region in the AR mode, it may be necessary to identify the tilt angle of the mobile terminal using the tilt angle determiner 630.

A view angle determiner 620 identifies the view angle of an image captured by the camera module 140. The angle of view or field of view indicates the extent of a given scene that is imaged by a camera. A wide angle image has a relatively wide angle of view; and a telephoto image has a relatively narrow angle of view. Different angles of view of the camera module 140 produce different images, causing the size of a display region for content display to vary. The angle of view of the camera module 140, which may be in-between a wide-angle and a telephoto angle, may be determined by a zoom ratio, which may be set in advance when the camera module 140 is installed in the mobile terminal and/or which may be selected and set by a user of the mobile terminal. Hence, the control unit 100 may determine the angle of view on the basis of the zoom ratio. The view angle determiner 620 may identify the zoom ratio set by the user when the camera module 140 is operated, and determine the angle of view of the camera module 140 on the basis of the identified zoom ratio.

A display region determiner 640 uses location information including latitude, longitude and altitude from the location determiner 220, direction information from the direction determiner 610, view angle information from the view angle determiner 620, and tilt angle information from the tilt angle determiner 630 to set a display region 700 for a content display as shown in FIGS. 7A to 7C. Here, content items stored in the content storage 240 may be created at locations near to or far from the current location of the user. In an example embodiment, content items are displayed that are created at locations near to the current location of the user in the display region. Hence, the display region determiner 640 may have visibility range information to display only content items whose creation location is within a predetermined or selected distance from the current location of the mobile terminal. This visibility range may be set by the manufacturer or by the user in a configuration setting mode. That is, the display region determiner 640 sets a display region for content display in the AR mode on the basis of location information including latitude, longitude and/or altitude, direction information and tilt angle information of the mobile terminal, view angle information of the camera module 140, and visibility range information.

A content selector 650 identifies the display region in terms of latitude, longitude and altitude, examines location information of content items stored in the content storage 240, and selects content items whose creation location belongs to the display region. Here, some stored content items may have been created at locations out of the visibility range; and the content selector 650 selects only content items whose creation location is within the visibility range in the display region. A display controller 660 controls the display unit 150 to display the selected content items at places indicated by latitude, longitude and altitude values of the content items. Consequently, an image captured by the camera module 140 is displayed on the display unit 150 and thumbnails of content items are displayed at places where the content items have been created on the captured image. Here, the displayed content items are content items that have been created at places within the visibility range in the display region. To distinguish content items created at nearby places from those content items created at distant places, the display controller 660 may display content items with icons or indicators of different sizes; for example, a content item created at a near place has a larger size on the display region in the display unit 150 than the size of a content item created at a distant place and/or the nearby and distant content items may be displayed in different predetermined colors, with nearby content items having a first color, and distant content items having a second and sufficiently different second color.

FIGS. 7A to 7C illustrate changes in the display region presenting thumbnails corresponding to content items according to tilt angles of the mobile terminal. That is, in the examples shown in FIGS. 7A to 7C, the location and direction of the mobile terminal and the view angle of the camera module 140 are the same and the tilt angle of the mobile terminal is different. FIG. 7A shows a neutral shot of buildings; FIG. 7B shows a low-angle shot taken in conditions comparable to those of FIG. 7A but with the mobile terminal having been lifted; and FIG. 7C shows a high-angle shot taken in conditions comparable to those of FIG. 7A but with the mobile terminal having been lowered. As the tilt angle determiner 630 outputs different tilt angles for the mobile terminal, the display region determiner 640 sets different display regions for content items as shown in FIGS. 7A to 7C. The content selector 650 examines location information of content items stored in the content storage 240, and selects content items whose creation location is within the visibility range in the display region. The display controller 660 displays the selected content items on the display unit 150.

Figure 8:
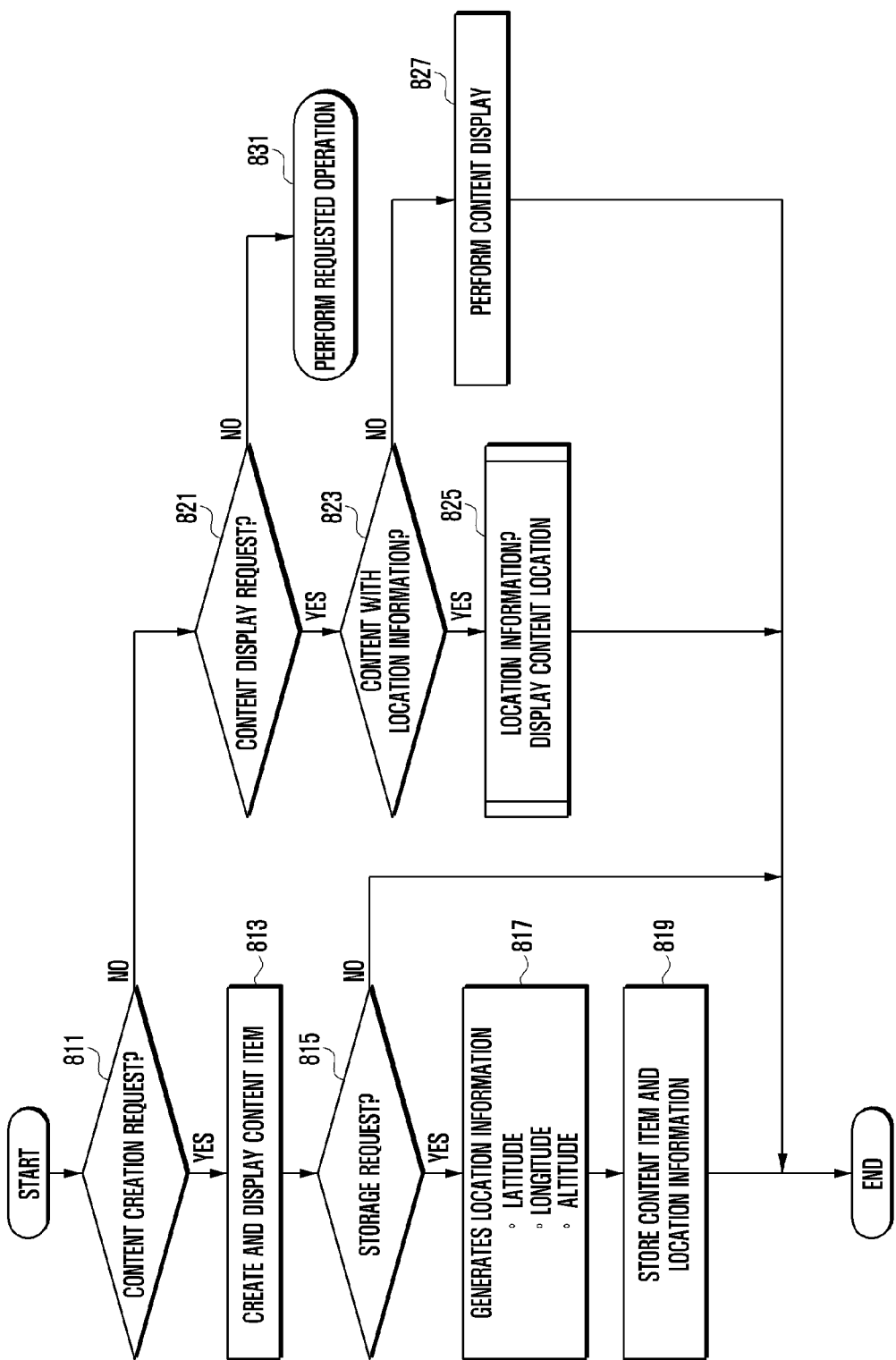
FIG. 8 is a flowchart of a method for creating and displaying content with location information according to an alternative exemplary embodiment of the present invention.

FIG. 8 is a flowchart of a method for creating and displaying content with location information according to an alternative exemplary embodiment of the present invention.

Referring to FIG. 8, the control unit 100 of the mobile terminal checks whether a content creation request is issued in step 811. If no content creation request is issued in step 811, the method proceeds to step 821. Otherwise, when a content creation request is issued in step 811, the control unit 100 creates a content item and displays the content item on the display unit 150 in step 813. Here, content may be image items captured by the camera module 140 such as photographs and moving images, information items created through the input unit 155 such as memos, documents and schedules, audio items created through an audio processing unit, as described herein, such as voice recordings, multimedia data downloaded through the communication unit 120 such as movies, documents, music files and others, and information items created by the user such as documents containing video, audio and image data. Content items that are displayable in three dimensions may be specified by the user in a setting mode or pre-specified in the manufacturing process.

The control unit 100 checks whether a storage request is issued by the user in step 815. If no storage request is issued, the method ends; otherwise, when a storage request is issued in step 815, the control unit 100 generates location information for the created content item using the GPS receiver 131 and the height sensor 133 in step 817. Here, the location information may be latitude, longitude and altitude of the place where the content item is created. When the GPS receiver 131 can identify all of latitude, longitude and altitude, the height sensor 133 may optionally not be used. Here, the GPS receiver 131 identifies, for example, latitude and longitude only on a plane. When the GPS receiver 131 identifies plane coordinates such as latitude and longitude of a location of the user and the height sensor 133 identifies the altitude of the location of the user, the control unit 100 determines the location including latitude, longitude and altitude where the content item is created on the basis of the results from the GPS receiver 131 and height sensor 133. Thereafter, the control unit 100 stores the created content item and associated location information in a content storage of the memory unit 110 in step 819, and the method ends. Here, the content storage is a portion of the memory unit 110 and a content item stored in the content storage may have a format illustrated in Table 1.

Content items stored in the content storage of the memory unit 110 may be displayed in three dimensions according to location information thereof. Referring back to step 811, when a content creation request is not issued, the control unit 100 checks whether a content display request is issued by the user in step 821. If no content display request is issued in step 821, the method proceeds to step 831 to perform a requested operation. Otherwise, when a content display request is issued in step 821, the control unit 100 determines whether the content display request is a request for content with location information in step 823. If the content display request is not a request for content with location information in step 823, the method proceeds to step 827. Otherwise, when the content display request is a request for content with location information, the control unit 100 sets a display region, selects content items whose creation location is within the display region, and displays the selected content items in step 825, and the method then ends. Content items with location information may be displayed in a map mode or an AR mode. Here, content items are displayed on a 3D map in the map mode, and are displayed on an image captured by the camera module 140 in the AR mode. When the content display request is not a request for content without location information, the control unit 100 performs an existing content display procedure in step 827, and then the method ends.

When a content display request is issued by the user, the control unit 100 may output a menu on the display unit 150 indicating selectable content display modes including a map mode and an AR mode. When the map mode is selected, the control unit 100 may output a menu on the display unit 150 indicating selectable map views such as street view, satellite view and 3D view, and may display a map in the selected view.

FIG. 9 is a flowchart of a procedure for displaying content with location information in the present invention. The procedure of FIG. 9 corresponds to step 825 in FIG. 8.

The map mode display is now described as follows.

The control unit 100 checks whether a map mode display is selected in step 911. If a map mode display is not selected in step 911, the method proceeds to step 931; otherwise, when map mode display is selected in step 911, the control unit 100 reads selected map data from the map storage 115 and displays the map data on the display unit 150 in step 913. Here, the map may be a map with a street view, satellite view or other known types of selected views. Map data may be downloaded through the communication unit 120 and stored in the map storage 115. The map storage 115 may be a removable storage device containing map data. While the map is displayed, the user may expand or reduce a selected region on the map through selections input to the input unit 155, or may select a region on the display unit 150 for content display. The control unit 100 checks whether a display region is selected on the map in step 915. If a display region is not selected in step 915, the method loops back to step 913; otherwise, when a display region is selected on the map in step 915, the control unit 100 sets the display region for content on the map in step 917. When the display region is set in step 917, the control unit 100 may obtain location information such as latitude, longitude and altitude values of the display region. The control unit 100 examines location information of content items stored in the content storage, and selects content items whose creation location is within the display region in step 919. The control unit 100 displays the selected content items in the display region on the map based on altitude values in step 921, and the method ends. That is, content items whose creation location is within the display region are selected and displayed in three dimensions on the map.

As described above, in response to a map display request, the control unit 100 reads requested map data from the map storage 115 and displays the map data. Here, the map is a 3D map with latitude, longitude and altitude values. When a display region is set on the map, the control unit 100 examines location information of content items stored in the content storage, and selects content items having latitude and longitude values belonging to the display region. Thereafter, the control unit 100 displays the selected content items as thumbnails in three dimensions on the map using altitude values as shown in FIG. 5A. In a state in which content items are displayed as thumbnails on the map as shown in FIG. 5A, when the user touches a thumbnail, the display controller 430 displays information; for example, a memo, on a content item associated with the touched thumbnail; and when the user selects a thumbnail, the display controller 430 displays details of a content item associated with the selected thumbnail on the display unit 150.

The AR mode display is now described as follows.

Referring to step 931 performed after step 911, the control unit 100 checks whether AR mode display is selected in 931. If the AR mode is not selected, in step 931, the method proceeds to step 951 to perform a display in a requested way or manner. Otherwise, when the AR mode display is selected in step 931, the control unit 100 operates the camera module 140 and displays an image captured by the camera module 140 on the display unit 150 in step 933. To set a display region for content display, the control unit 100 identifies the following parameters in step 935. First, the control unit 100 determines the current location of the mobile terminal using outputs from the GPS receiver 131 and/or the height sensor 133. The current location is used to select a content item whose creation location is within a given distance from the current location in the direction of the camera module 140. Second, the control unit 100 identifies the direction of the camera module 140 using an output from the direction sensor 135, which may be a geomagnetic sensor and/or a gyroscopic sensor. The direction of the camera module 140 is used to determine the direction of an image captured by the camera module 140. In the AR mode, as content is displayed on an image captured by the camera module 140, the direction of the captured image is determined using the output from the direction sensor 135. Third, the control unit 100 identifies the tilt angle of the mobile terminal, such as an angle with respect to the ground, using an output from the angle detection sensor 137. The tilt angle is used to determine the camera angle, which is necessary to set a desired display region in the AR mode. That is, when the camera angle is changed while other conditions are kept constant, the latitude and longitude of the captured image on the display unit 150 do not change but the altitude thereof may change. In other words, a high-angle shot and a low-angle shot taken at the same place may produce different images. Hence, to set a display region in the AR mode, it is necessary to identify the tilt angle of the mobile terminal. Fourth, the control unit 100 identifies the view angle of an image captured by the camera module 140. The angle of view or field of view indicates the extent of a given scene that is imaged by a camera. The angle of view of the camera module 140, which may be in-between a wide-angle and telephoto angle, may be determined by the zoom ratio, which may be set by the user when the camera module 140 is operated. Hence, the control unit 100 may determine the angle of view on the basis of the zoom ratio. The angle of view is used to identify the size of a display region on the display unit 150, such as a wide-angle size or a telephoto size.

Thereafter, the control unit 100 sets a display region for content display on the basis of location information including latitude, longitude and altitude, direction information, tilt angle information of the mobile terminal, and view angle information of the camera module 140 in step 937. Content items stored in the content storage 240 may be created at locations near to or far from the current location of the user.

The present invention may display content items that are created at locations near to the current location of the user in the display region. The control unit 100 may have visibility range information to display only content items whose creation location is within a predetermined distance from the current location of the mobile terminal. Hence, the control unit 100 sets a display region for content display in the AR mode on the basis of location information such as latitude, longitude and/or altitude, direction information and tilt angle information of the mobile terminal, view angle information of the camera module 140, and visibility range information.

The control unit 100 identifies the display region in terms of latitude, longitude and altitude, examines location information of content items stored in the content storage of the memory unit 110, and selects content items whose creation location belongs to the display region in step 939. Here, the control unit 100 may select only content items whose creation location is within the visibility range in the display region. The control unit 100 controls the display unit 150 to display the selected content items at places indicated by latitude, longitude and altitude values of the content items as shown, for example, in FIGS. 7A to 7C in step 941. Consequently, an image captured by the camera module 140 is displayed on the display unit 150 and thumbnails of content items are displayed at places where the content items have been created on the captured image. Here, the displayed content items are content items that have been created at places within the visibility range of the display region. To distinguish content items created at nearby places from those created at distant places, the display controller 660 may display content items in different sizes; for example, a content item created at a nearby place has a larger size than the size of a content item created at a distant place, or in different colors, as described herein.

Figure 10A:
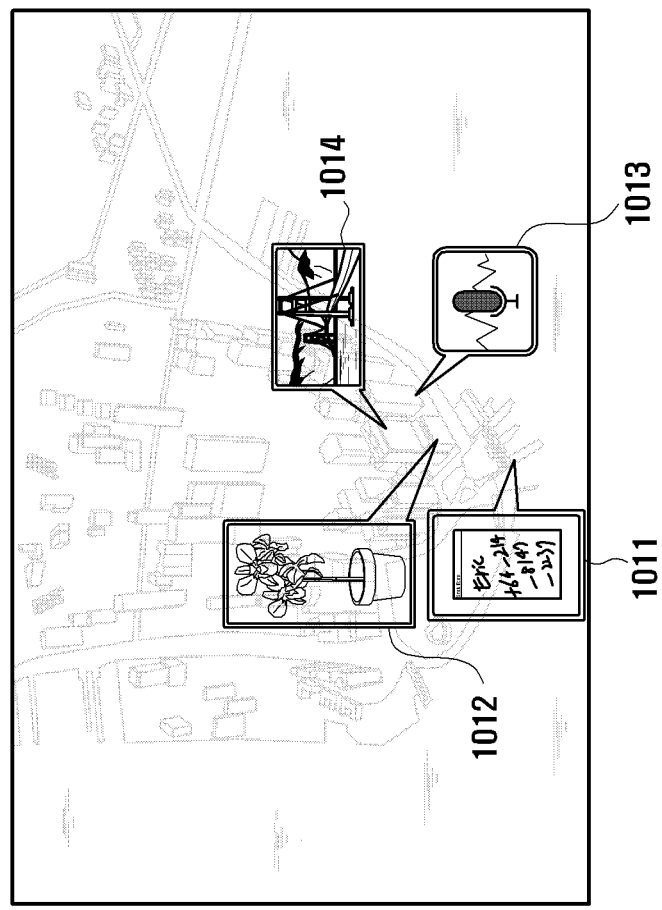
FIG. 10A illustrates types of content in the present invention.

In the present invention, there may be various types of content. FIG. 10A illustrates types of content in the present invention, and FIG. 10B illustrates a display of memos in the present invention written at the time of content creation.

Figure 10B:
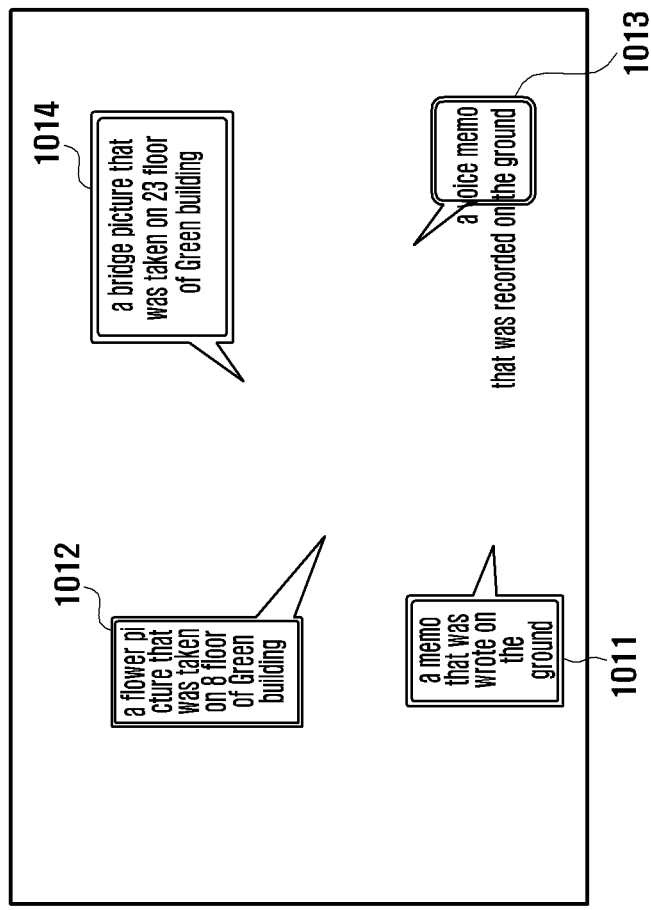
FIG. 10B illustrates display of memos in the present invention written at the time of content creation.

Referring to FIGS. 10A and 10B, content items 1011 to 1014 are content items that are created at places within the display region. The content item 1011 is a memo; each of the content items 1012 and 1014 are a photograph; and the content item 1013 is a voice recording, with each of the content items represented by default icons and/or thumbnails of actual photographs corresponding to such content items. For content creation, the control unit 100 creates a content item in a format illustrated in Table 1 and stores the created content item in the content storage of the memory unit 110. Each of the created content items 1011-1014 may also include a description of the associated content, as shown in FIG. 10B, with such descriptions optionally included in the corresponding entry of the content item stored in the content storage 240, for example, in the Memo field in Table 1. For content display in the map mode or the AR mode, the control unit 100 sets a display region and displays content items whose creation location is within the display region as thumbnails or icons as shown in FIG. 10A. In a state in which content items are displayed in three dimensions as shown in FIG. 10A, when the user selects a content item, the control unit 100 may display location information of the selected content item, as shown in FIG. 3.

As described above, in the present invention, when a content item is created, location information including latitude, longitude and altitude of the place at which the content item is generated is stored together with the content item. Later, content items are displayed using location information thereof. That is, content items whose creation location is within a display region are selected and displayed as thumbnails or icons at creation locations thereof. When a gallery viewer is used that can display images and their location information together, the gallery viewer can produce effects similar to a 3D viewer. In addition, there may be various different types of content such as memos, voice recordings, videos and photographs.

In one exemplary embodiment, when stored content items including location information are provided after the camera module 140 is operated, the mobile terminal may present an AR content view to the user without using a special or separate service for providing the location information. In the AR mode, when the camera module 140 captures an image of a scene in a selected direction, the mobile terminal may produce special effects by mapping photographs, videos, and memos to a physical space.

In another exemplary embodiment, when content items are displayed on a map with a street view, satellite view or 3D view, the content items are positioned at their creation locations on the map.

In the present invention, the mobile terminal may store content together with location information at the time of creation and display content in various ways based on the location of creation. In addition, the mobile terminal may store content together with location information collected by a combination of sensors at the time of creation and present content in various perspectives on a 3D map or on an image captured by a camera module through a combination of location information, sensing information and geographical information.

The above-described apparatus and methods according to the present invention can be implemented in hardware, firmware or as software or computer code that can be stored in a non-transitory recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

Although exemplary embodiments of the present invention have been described in detail hereinabove, it should be understood that many variations and modifications of the basic inventive concept described herein will still fall within the spirit and scope of the present invention as defined in the appended claims.

What is claimed is:

1. An apparatus for content display, comprising:
a memory storing content items;
a display unit; and
a control unit configured to:
 display, on the display unit, a display region, the display region including images of physical structures; and
 display, in the display region, one or more content items, wherein the displaying includes superimposing each of the content items onto an image of a physical structure in which the content item is created at a position in the image of the physical structure that is situated between a first end and a second end of the physical structure, the position being selected based on an altitude of a location at which the content item is created.

2. The apparatus of claim 1, wherein each of the content items is resized based on a distance between a current location of the apparatus and the location at which that content item is created prior to that content item being superimposed.

3. The apparatus of claim 1, wherein each of the content items is displayed in a color that is selected based on a distance between a current location of the apparatus and the location at which that content item is created prior to that content item being superimposed.

4. The apparatus of claim 1, further comprising a camera module and a sensing unit for generating current location information of the apparatus including latitude, longitude and altitude, wherein:
the sensing unit comprises a direction determiner identifying a current shooting direction of the camera module, a view angle determiner identifying a view angle of the camera module, and a tilt angle determiner identifying a tilt angle of the apparatus;
the images of the physical structures are captured by the camera module; and
the control unit, when operating the camera module in an Augmented Reality (AR) mode, is further configured to select the one or more content items based on the tilt angle and the view angle.

5. The apparatus of claim 4, wherein:
the sensing unit further comprises a geolocation receiver identifying latitude and longitude, and a height sensor identifying altitude, the direction determiner includes a geomagnetic sensor, and wherein the tilt angle determiner includes at least one of an acceleration sensor and a gyroscopic sensor.

6. The apparatus of claim 1, further comprising a camera module, a communication unit, and an input unit generating alphanumeric data, and wherein the content items include, at least one of photographs taken by the camera module, data downloaded through the communication unit, and text information created through the input unit.

7. An apparatus for content display, comprising:
a display unit; and
a control unit configured to:
 display, on the display unit, selected map data, the selected map data including at least one three-dimensional (3D) object; and
 display one or more content items created at locations represented by the selected map data, wherein the displaying of the one or more content items includes superimposing each of the one or more content items onto an image of a 3D object at a position in the image of the 3D object that is situated between a first end of the 3D object and a second end of the 3D object, the position being selected based on an altitude of the location at which that content item is created.

8. The apparatus of claim 7, wherein each of the content items is resized based on a distance between a current location of the apparatus and the location at which that content is created prior to that content item being superimposed onto the map data.

9. An apparatus for content display, comprising:
a camera module;
a control unit configured to:
display an image captured by the camera module; and
display one or more content items created at locations depicted in the displayed image, wherein the displaying of the one or more content items includes superimposing the one or more content items onto the image, wherein each of the displayed content items is superimposed onto the image based on an altitude of the location at which that content item is created,
wherein each of the content items is resized based on a distance between a current location of the apparatus and the location at which that content item is created prior to that content item being superimposed onto the image.

10. The apparatus of claim 9, further comprising one or more sensors for detecting a view angle of the camera module and a tilt of the camera module wherein the control unit is further configured to examine location information of content items stored in a memory and select the one or more content items based on the view angle of the camera module and the tilt of the camera module.

11. The apparatus of claim 9, further comprising:
a geolocation receiver identifying latitude and longitude;
a height sensor identifying altitude;
a geomagnetic sensor, and
at least one of an acceleration sensor and a gyroscopic sensor.

12. The apparatus of claim 9, wherein each of the content items is displayed in a color that is selected based on the distance between the current location of the apparatus and the location at which that content item is created prior to that content item being superimposed onto the image.

13. A method for content display in an electronic device, comprising:
storing, in a memory, content items;
displaying, on a display unit, a display region, the display region including images of physical structures; and
displaying, in the display region, one or more content items, wherein the displaying includes superimposing each of the content items onto an image of a physical structure in which the content item is created at a position in the image of the physical structure that is situated between a first end and a second end of the physical structure, the position being selected based on an altitude of a location at which that content item is created.

14. The method of claim 13, wherein each of the content items is resized based on a distance between a current location of the electronic device and the location at which that content item is created prior to that content item being superimposed.

15. The method of claim 13, wherein each of the content items is displayed in a color that is selected based on a distance between a current location of the electronic device and the location at which that content item is created prior to that content item being superimposed.

16. The method of claim 13, wherein the content items include at least one of photographs taken by a camera module of the electronic device, data downloaded through a communication unit, and text information created through an input unit.

17. A method for content display in an electronic device, comprising:
   storing, in a memory, content items;
   displaying, on a display unit, selected map data, the selected map data including at least one three-dimensional (3D) object; and
   displaying one or more content items created at locations represented by the selected map data, wherein the displaying of the one or more content items includes superimposing each of the one or more content items onto an image of a 3D object at a position in the image of the 3D object that is situated between a first end of the 3D object and a second end of the 3D object, the position being selected based on an altitude of the location at which that content item is created.

18. The method of claim 17, wherein each of the content items is resized based on a distance between a current location of the electronic device and the location at which that content is created prior to that content item being superimposed onto the map data.

19. The method of claim 17, wherein the selected map data includes street view data and satellite view data.

20. A method for content display in an electronic device, comprising:
   storing, in a memory, content items;
   displaying an image captured by a camera module of the electronic device; and
   displaying one or more content items created at locations depicted in the image, wherein the displaying of the content items includes superimposing the content items onto the image, wherein each of the one or more content items is superimposed onto the image based on an altitude of the location at which that content item is created;
   wherein each of the content items is resized based on a distance between a current location of the electronic device and the location at which that content is created prior to that content item being superimposed onto the image of that content item's respective physical structure.

21. The method of claim 20, further comprising examining location information of content items stored in the memory, wherein the one or more content items are selected based on being created at locations depicted in the image.

22. The method of claim 20, wherein each of the content items is displayed in a color that is selected based on the distance between the current location of the electronic device and the location at which that content item is created prior to that content item being superimposed onto the image.

* * * * *